Figure 1:
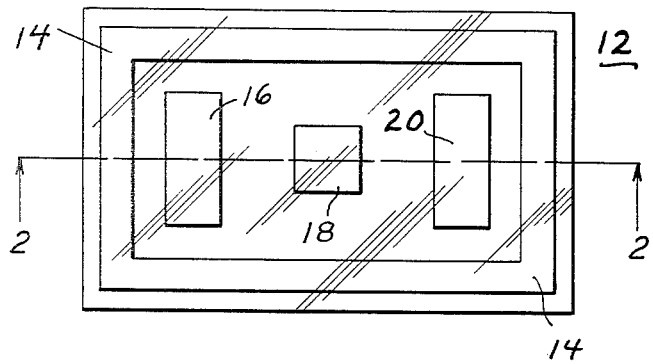

April 12, 1966     J. P. GITS     3,246,066

METHOD OF MAKING THREE DIMENSIONAL MOLDED ARTICLES

Filed April 17, 1963     2 Sheets-Sheet 1

INVENTOR.
JULES P. GITS
BY
Roy Eilers
ATTORNEY.

INVENTOR.
JULES P. GITS

United States Patent Office 3,246,066
Patented Apr. 12, 1966

3,246,066
METHOD OF MAKING THREE DIMENSIONAL MOLDED ARTICLES
Jules P. Gits, 1003 Lathrop Ave., River Forest, Ill.
Filed Apr. 17, 1963, Ser. No. 273,679
3 Claims. (Cl. 264—132)

This invention relates to improvements in methods of making molded articles. More particularly, this invention relates to improvements in the method of making molded articles which have three-dimensional indicia or ornamentation incorporated therein.

It is, therefore, an object of the present invention to provide an improved method of making a molded article which has three-dimensional indicia or ornamentation incorporated therein.

It is frequently desirable to make molded articles which have three-dimensional indicia or ornamentation incorporated therein. For example, it is frequently desirable to make molded medallions which can be secured to the hoods, fenders or trunks of automobiles, to make molded medallions for the steering wheel posts, dashboard panels or horn buttons of automobiles, and to make molded medallions and molded name-plates for electrical appliances; and it is usually desirable for those molded medallions and molded name-plates to have three-dimensional indicia or ornamentation incorporated therein. Those molded medallions and molded name-plates are usually made by molding obdies of clear platic material with appropriately-designed recesses in the rear faces thereof, and then subsequently coloring various portions of those recesses with ink, paint, bits of metal foil, or the like. While the resulting molded articles are handsome, attractive, and useful, they are expensive. It would be desirable to provide molded articles which have three-dimensional indicia or ornamentation incorporated therein but which are moderate in cost. The present invention makes it possible to provide molded articles which have three-dimensional indicia or ornamentation incorporated therein and which are moderate in cost; and it does so by printing and embossing foils so they have the desired three-dimensional indicia or ornamentation on the front faces thereof, and then injecting clear molten plastic material against those front faces. The resulting molded articles are handsome, attractive, and useful, but they are moderate in cost. It is, therefore, an object of the present invention to make a molded article, which has three-dimensional indicia or ornamentation incorporated therein, by printing and embossing a foil with the desired three-dimensional indicia or ornamentation on the front face thereof and then injecting clear plastic material against that front face.

It would be particularly desirable to be able to use metal foils in making the molded articles of the present invention; but, unfortunately, metal foils and clear plastic materials do not have natural affinities for each other. As a result, the bonds between some metal foils and some clear plastic materials have not been sufficiently intimate to keep persons form peeling those metal foils away from those clear plastic materials. Any peeling of the metal foils away from the clear plastic materials of the molded articles provided by the present invention would be unacceptable; and the present invention precludes and obviates any such peeling. The present invention precludes and obviates peeling of the metal foils by c oating the front faces of those metal foils with a solution which contains some of the clear plastic material that will subsequently be injected against those front faces. The said coating will respond to the heat, of the molten plastic material which is injected against the coated faces of the metal foils, to melt and to form an inter-face between the metal foils and that plastic material. That inter-face will be clear and will, to the ordinary observer, be indistinguishable from the clear plastic material; but that inter-face will intimately and permanently bond that clear plastic material to the front faces of the metal foils. It is, therefore, an object of the present invention to print and emboss metal foils to form three-dimensional indicia or ornamentation on the front faces thereof, to coat those front faces with a solution that contains some of the clear plastic material that is to be injected against those front faces, and then to direct that plastic material against those front faces to cause that coating to form an interface between that plastic material and those metal foils.

The foils provided by the present invention are made thin, so they can be embossed without cracking; and the pressures on the injected plastic material are so great that they could flatten out the three-dimensional indicia or ornamentation on the front faces of those foils if the said indicia or ornamentation were to be unsupported while that plastic material was being injected. The present invention keeps the pressures on the injected plastic material from flattening the three-dimensional indicia or ornamentation on the front faces of the foils by using a mold with raised areas that underlie and fully support those three-dimensional indicia or ornamentation. As a result, the three-dimensional indicia or ornamentation on the front faces of the foils are not flattened during the injection of the clear plastic material. It is, therefore, an object of the present invention to provide a mold which has raised areas that underlie and fully support the three-dimensional indicia or ornamentation on the front faces of the foils while the clear plastic material is being injected.

Other and further objects and advantages of the present invention should become apparent from an examination of the drawing and accompanying description.

In the drawing and accompanying description a preferred embodiment of the present invention is shown and described, but it is to be understood that the drawing and accompanying description are for the purpose of illustration only and do not limit the invention and that the invention will be defined by the appended claims.

Figure 2:
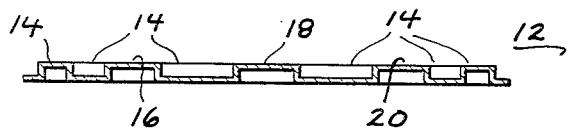
Figure 3:
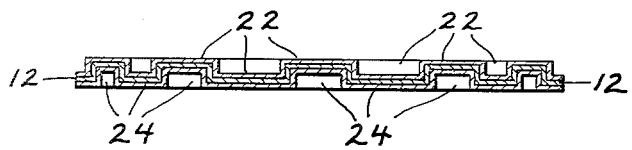
Figure 4:
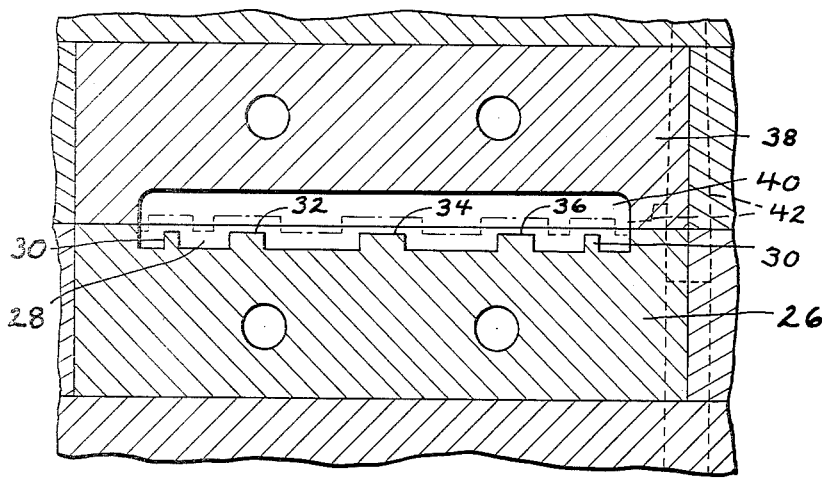
Figure 5:
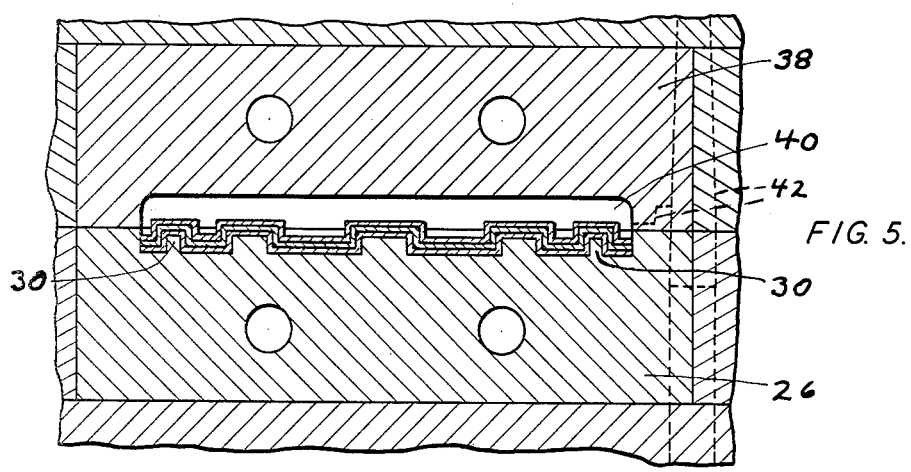
Figure 6:
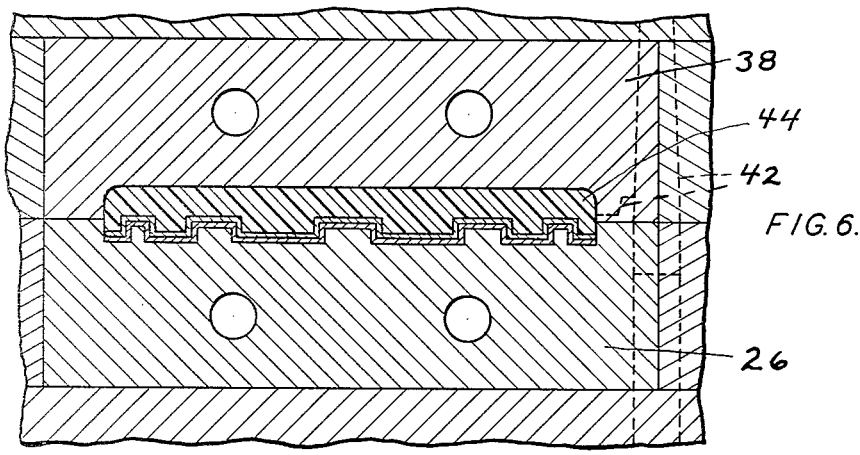
Figure 7:

In the drawing,

FIG. 1 is a plan view of a foil that is made in accordance with the principles and teachings of the present invention, FIG. 2 is a sectional view through the foil of FIG. 1, and it is taken along the plane indicated by the line 2—2 in FIG. 1, FIG. 3 is a sectional view through the foil of FIG. 1 after a coating has been applied to the front face of that foil and a second coating has been applied to the rear face of that foil, FIG. 4 is a sectional view through a mold in which the coated foil of FIG. 3 will be disposed, FIG. 5 is a sectional view through the mold of FIG. 4, and it shows the coated foil of FIG. 3 disposed within that mold, FIG. 6 is another sectional view through the mold of FIG. 4, and it shows the coated foil of FIG. 3 after a clear plastic material has been injected against the front face of that foil, and FIG. 7 is a sectional view through the finished molded article.

Referring to the drawing in detail, the numeral 12 denotes a foil which has been printed and embossed to have three-dimensional indicia or ornamentation on the front face thereof. That foil will preferably be a metal foil; and, in one preferred embodiment of the present invention, the foil 12 was an aluminum sheet that was five thousandths of an inch thick. Aluminum is a desirable metal for use in a foil because it is easily embossed and because it has a high index of reflection. Further, aluminum is a desirable metal for use in a foil because the thermal coefficient of expansion of aluminum is not too dissimilar from the thermal coefficient of expansion of acrylic plastic material. The foil 12 also can be made from a sheet of brass, a sheet of chromium-plated steel, or a sheet of other plated or unplated metal or alloy.

For the sake of clarity and simplicity, the foil 12 has been shown as being embossed to have a very simple geometric pattern on the front face thereof. Specifically, that foil has been shown with a continuous border 14, a rectangular area 16, a square area 18, and a rectangular area 20 embossed on the front face thereof. However, in practice, the embossed areas on the front faces of the foils will usually be ornamental and artistic in nature and motif; and those embossed areas can be quite intricate and delicate in design and execution. To enable the embossing to be intricate and delicate in execution and detail, it is helpful to use metal foils that have a thickness between two and five thousandths of an inch.

The numeral 22 denotes a coating which is formed on the printed and embossed front face of the foil 12; and that coating will preferably be a lacquer of the clear plastic material and will be injected against that printed and embossed front face. The technique of making such a lacquer is well known to those skilled in the art; and the making of that lacquer is not a part of the present invention. The thickness of the coating 22 is greatly exaggerated in FIGS. 3 and 5 so that coating can be seen; because in actual practice that coating will be so thin that it would be difficult to recognize it with the naked eye.

The numeral 24 denotes a coating which is formed on the rear face of the foil 12 and that coating also will preferably be a lacquer of the clear plastic material that will be injected against the printed and embossed front face of that foil. The thickness of the coating 24 is greatly exaggerated in FIGS. 3, 5 and 6 so that coating can be seen; because in actual practice that coating will be so thin that it would be difficult to recognize it with the naked eye.

The foil 12 will be suitably printed to have the desired indicia or ornamentation on the front face thereof; and then that foil will be placed in an embossing press. The die of that press will "draw" the foil 12 until the indicia or ornamentation 14, 16, 18 and 20 on the front face thereof have the desired three-dimensional configuration. Once the foil has been formed, the coatings 22 and 24 can be applied to the front and rear faces thereof, as by use of a paint spray, a paint brush, or the like. Those coatings will be permitted to dry before the foil 12 is inserted within the mold in which the molded article will be formed.

The said mold includes a mold section 26 which has a recess 28 in the upper face thereof. A raised portion 30, which corresponds to the coated recess that was formed in the rear face of the foil 12 when the border 14 was embossed, is provided in the recess 28. A raised portion 32, which corresponds to the coated recess that was formed in the rear face of the foil 12 when the rectangular area 16 was embossed, is provided in the recess 28. A raised portion 34, which corresponds to the coated recess that was formed in the rear face of the foil 12 when the square area 18 was embossed, is provided in the recess 28; and a raised portion 36, which corresponds to the coated recess that was formed in the rear face of the foil 12 when the rectangular area 20 was embossed, is provided in the recess 28. The raised portions 30, 32, 34 and 36 are designed and dimensioned so they are complementary to and fill the said coated recesses. As a result, the coated foil 12 can be set in position within the recess 28 and have all portions of the rear face thereof receive full support from that recess and the raised portions 30, 32, 34 and 36 therein.

The numeral 39 denotes a second mold section for the said mold; and a recess 40 is provided in the lower face of that mold section. The recesses 28 and 40 coact to define a cavity which will not only accommodate the metal foil 12 but will also accommodate the clear plastic material which will be injected against the front face of that foil. A sprue 42, which is shown in dotted lines in FIGS. 4–6, communicates with the cavity defined by the recesses 28 and 40; and that sprue also extends to a suitable gate which can be connected to a source of molten plastic material.

In making the molded article provided by the present invention, the foil 12 is formed in an embossing press, and is then removed from that press, coated, and permitted to dry. Thereafter, the mold sections 26 and 38 are separated, and the coated foil 12 is placed within the recess 28 so the coated recesses in the rear face thereof are in register with the raised portions 30, 32, 34 and 36. It will be a simple matter for the operator of the press to properly position the foil 12 within the recess 28, as indicated by FIG. 5. Thereafter, the mold sections 26 and 38 will be moved into engagement with each other to define the cavity into which the clear plastic material will be injected. That plastic material will flow through the sprue 42 and enter that cavity; and that plastic material will hold the foil 12 solidly against the bottom of the recess 28 and against the raised portions 30, 32, 34 and 36.

The heat, of the molten plastic material which engages the printed and embossed front face of the foil 12, will cause the coating 22 to become molten and to admix with that molten plastic material. In doing so, that coating will become a substantially invisible inter-face between the printed and embossed front face of the foil 12 and the clear plastic material 44. That inter-face will cause the clear plastic material 44 to permanently and intimately adhere to the printed and embossed front face of the foil 12.

The heat, from the molten plastic material that engages the printed and embossed front face of the foil 12, will be transmitted through that foil to the coating 24 at the rear face of that foil. That heat will cause that coating to become molten and to permanently and intimately adhere to that rear face. That coating will protect the foil 12 from scratches and cuts during the handling of the molded article. Also, that coating will protect the edges of that foil from being abraded and torn during the handling of the molded article.

During the injecting of the clear plastic material into the cavity defined by the recesses 28 and 40, that plastic material will apply heavy pressures to the front face of the foil 12. Those pressures will tend to flatten the printed and embossed indicia or ornamentation 14, 16, 18 and 20 of that front face. However, the raised portions 30, 32, 34 and 36 in the recess 28 will fully support the front and side portions of the said indicia or ornamentation; and hence the three-dimensional configuration of the said indicia or ornamentation will not be changed by the heavy pressures applied to the front face of the foil 12 by the clear plastic material as that plastic material is being injected.

At the conclusion of the injection step, the foil 12 will have a mass 44 of clear plastic material intimately and permanently bonded to the printed and embossed front face thereof; and will have a second, but much thinner, mass of clear plastic material intimately and permanently bonded to the rear face thereof. As a result, that foil will be fully protected against scratching, cutting, abrading or tearing. The mass of clear plastic material which is intimately and permanently bonded to the printed and embossed front face of the foil 12 will coact with the inter-face, formed by the coating 22, to permit full and clear viewing of the indicia or ornamentation 14, 16, 18 and 20.

The finished molded article is denoted by the numeral 46 in FIG. 7; and that article is handsome, attractive and useful. Further, that article is moderate in cost. That article can be suitably secured in position by the use of a glue or cement that is applied to the rear face thereof.

A number of different clear thermoplastic materials could be used to form the mass 44. Acrylic plastic material, butyrate plastic material, and styrene plastic material are examples of thermoplastic materials which could be used. Where an acrylic plastic material is used to form the mass 44, the coating 22 should be a lacquer of acrylic plastic material. Where a butyrate plastic material is used to form the mass 44, the coating 22 should be a lacquer of butyrate plastic material; and where a styrene plastic material is used to form the mass 44, the coating 22 should be a lacquer of styrene plastic material.

The foil 12 can be made from metal sheets of different thicknesses. Preferably, those sheets will not be less than two thousandths of an inch thick, because foils which are that thin are easily bent during the handling thereof. Also, preferably, those sheets will not be more than ten thousandths of an inch thick, because it is difficult to form intricate and delicate embossings on thick sheets.

Where the molded article 46 can be handled in such a manner that the rear face thereof will not be scratched or cut and the edges thereof will not be abraded or torn, the coating 24 will not be needed. This means that the foil 12 will have just the coating 22 thereon when it is placed within the cavity defined by the recesses 28 and 40. Also, this means that the rear face of the foil 12 will directly receive the glue or cement which will be used to hold the molded article 46 in position. That foil will keep that glue or cement from reaching and adversely affecting the mass 44 of clear plastic material at the front of the molded article.

Where desired, the metal foil 12 could be provided with a backing of paper or plastic material before it was printed and embossed. Such a backing would enable very thin metal foils to be handled without being bent. Where the foil 12 is provided with such a backing, the coating 24 will be applied to the rear face of that backing. In one preferred embodiment of the present invention, the foil 12 was made from an aluminum sheet that was two and one-half thousandths of an inch thick and that had a paper backing which was five thousandths of an inch thick.

Where desired, the foil 12 can be made from clear plastic material. Specifically, a sheet of clear plastic material can have the border 14, the rectangular area 16, the square area 18, and the rectangular area 20 printed on the front face thereof with ink that is compatible with the material of that sheet and that also is compatible with the clear plastic material 44. The printing of the border 14, the rectangular area 16, the square area 18, and the rectangular area 20 can easily be accomplished because that border and those areas are individually spaced apart; and hence the ink on that border and on those areas will not tend to "run" together.

The printed foil will then be placed in a press which has a heated die. That die will soften the foil sufficiently to enable that foil to be embossed; and as a result, that foil will have three-dimensional printed areas thereon.

The printed and embossed foil will then be placed in a cavity such as the cavity, defined by the recesses 28 and 40 in FIGS. 4–6; and the raised portions 30, 32, 34 and 36 in the recess 28 will extend into and fully support the recesses that were formed in the rear face of that foil when the border 14, the rectangular area 16, the square area 18, and the rectangular area 20 were formed. This means that when clear plastic material is injected into that cavity, the heavy pressures on that plastic material will not flatten the border 14, the rectangular area 16, the square area 18, and the rectangular area 20. The injected plastic material will heat the front face of the foil sufficiently to form an intimate and permanent bond between that plastic material and that front face, but will not heat that front face sufficiently to cause that front face to flow and loose its three-dimensional configuration. As a result, the mass of clear platic material and the foil will be united into one molded article which will have the printed and embossed indicia or ornamentation 14, 16, 18 and 20 incorporated therein.

Thereafter, a suitable background will be provided for the border 14, the rectangular area 16, the square area 18, and the rectangular area 20 by applying paint or metal to the rear face of the foil. The paint will preferably be sprayed onto that rear face, and the metal will preferably be vaporized and then condensed on that rear face; but in any event that paint or metal will provide the desired color contrast with the ink used in printing the border 14, the rectangular area 16, the square area 18, and the rectangular area 20. Subsequently, a protective coating of paint or the like could be applied to that paint or metal coating on the rear face of the foil.

A plastic foil can be made from an acrylic plastic material, from a butyrate plastic material, from a styrene plastic material, or from other clear thermoplastic materials. Any such foil preferably will not be less than two thousandths of an inch thick, because foils which are that thin are easily bent during the handling thereof. Also, preferably, those foils will not be more than ten thousandths of an inch thick, because it is difficult to form intricate and delicate embossings on thick foils.

Whereas a preferred embodiment of the present invention has been shown and described in the drawing and accompanying description, it should be apparent to those skilled in the art that various changes may be made in the form of the invention without affecting the scope thereof.

What I claim is:

1. The method of making a molded article which has three-dimensional indicia or ornamentation incorporated therein and which comprises:
    (a) forming three-dimensional indicia or ornamentation on the front face of a foil which is no thinner than two thousandths of an inch and which is no thicker than ten thousandths of an inch,
    (b) coating the front face of said foil and the indicia or ornamentation thereon with a coating which includes clear plastic material, said foil having a plurality of recesses in the rear face thereof which conform to and underlie said indicia or ornamentation and which cause said indicia or ornamentation to extend forwardly beyond adjacent portions of said foil to give said indicia or ornamentation a three-dimensional configuration,
    (c) supporting and reinforcing said indicia or ornamentation on said front face of said foil, by disposing within each of said recesses a supporting surface which is complementary to and which fills said recess so said indicia or ornamentation can withstand injection molding pressures and will not collapse when clear molten plastic material is injected against said front face of said foil under such pressure,
    (d) injecting clear plastic material under heavy pressure in the molten state, against said front face of said foil and against said indicia or ornamentation on said front face of said foil,
    (e) permitting said injected clear plastic material to melt said coating,
    (f) the melting of said coating enabling said coating to form an inter-face between said foil and said injected clear plastic material, and
    (g) permitting said injected clear plastic material to harden and bond solidly to, and constitute a thick, transparent, and reinforcing window for, said indicia or ornamentation on the front of said foil.

2. The method of making a molded article which has three-dimensional indicia or ornamentation incorporated therein and which comprises:
    (a) forming three-dimensional indicia or ornamentation on the front face of a foil which is no thinner than two thousandths of an inch and which is no thicker than ten thousandths of an inch,
    (b) coating the front face of said foil and the indicia or ornamentation thereon with a coating which includes a clear plastic material, (c) coating the rear face of said foil and said recesses formed in said rear face when said indicia or ornamentation are formed on said front face of said foil with a second coating which includes said clear plastic material, (d) supporting and reinforcing said indicia or ornamentation on said front face of said foil, by disposing within each of said recesses a supporting surface which is complementary to and which fills said recess, so said indicia or ornamentation can withstand injection molding pressures and will not collapse when some of said clear plastic material, in the molten state, is injected against said front face of said foil under such pressures, (e) injecitng some of said clear plastic material under heavy pressure in the molten state, against said front face of said foil and against said indicia or ornamentation on said front face of said foil, (f) permitting said injected clear plastic material to melt the first said coating and to melt said second coating, the melting of the first said coating enabling said first coating to form an inter-face between said foil and said injected clear plastic material which firmly bonds said injected clear plastic material to said foil, and the melting of said second coating enabling said second coating to protect the edges of said foil against abrading and tearing, and (g) permitting said injected clear plastic material to harden and constitute a transparent window for said indicia or ornamentation on the front of said foil.

3. The method of making a molded article which has three-dimensional indicia or ornamentation incorporated therein and which comprises:

(a) forming three-dimensional indicia or ornamentation on the front face of a foil which is no thinner than two thousandths of an inch and which is no thicker than ten thousandths of an inch, (b) supporting and reinforcing said indicia or ornamentation on said front face of said foil, by disposing within each of said recesses a supporting surface which is complementary to and which fills said recess, so said indicia or ornamentation can withstand injection molding pressures, and will not collapse when clear molten plastic material is injected against said front face of said foil under such pressures, (c) injecting clear plastic material under heavy pressure, in the molten state, against said front face of said foil and against said indicia or ornamentation on said front face of said foil, (d) permitting said injected clear plastic material to harden and bond solidly to, and constitute a thick, transparent, and reinforcing window for, said indicia or ornamentation on the front of said foil, said foil being of clear plastic material, (e) coloring the rear face of said foil to fill the spaces between said indicia or ornamentation, and (f) applying a protective coating to the coloring on said rear face of said foil.

References Cited by the Examiner

UNITED STATES PATENTS

| | | | |
|---|---|---|---|
| 1,977,960 | 10/1934 | Weindel | 161—138 |
| 2,141,488 | 12/1938 | Riedel | 161—138 |
| 2,289,084 | 7/1942 | Temple | 18—59 |
| 2,357,950 | 9/1944 | Goessling | 18—59 |
| 2,565,803 | 8/1951 | Danielson et al. | 264—135 |
| 2,581,718 | 1/1952 | Schaffert et al. | 161—138 XR |
| 2,633,603 | 4/1953 | Huse | 18—42 |
| 2,779,057 | 1/1957 | Graham | 18—17 |
| 3,117,053 | 1/1964 | Lawrence et al. | 264—132 XR |
| 3,122,598 | 2/1964 | Berger | 264—132 XR |

FOREIGN PATENTS 812,572   4/1959   Great Britain.

ROBERT F. WHITE, *Primary Examiner.*

JACOB STEINBERG, *Examiner.*